(12) United States Patent
Lee et al.

(10) Patent No.: US 10,393,286 B2
(45) Date of Patent: Aug. 27, 2019

(54) VALVE POSITION INDICATOR FOR VALVE SHUTTER

(71) Applicant: Samsung Electronics Co., Ltd., Suwon-si, Gyeonggi-do (KR)

(72) Inventors: Hyung-Suk Lee, Hwaseong-si (KR); Sang-Won An, Incheon (KR); Duk-Chun Jang, Gimpo-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/714,028

(22) Filed: Sep. 25, 2017

(65) Prior Publication Data

US 2018/0100604 A1 Apr. 12, 2018

(30) Foreign Application Priority Data

Oct. 10, 2016 (KR) .......................... 10-2016-0130601

(51) Int. Cl.
*F16K 31/53* (2006.01)
*F16K 37/00* (2006.01)
(Continued)

(52) U.S. Cl.
CPC .......... *F16K 37/0008* (2013.01); *F16K 31/53* (2013.01); *F16K 31/60* (2013.01); *F16K 37/0016* (2013.01); *F17C 13/04* (2013.01)

(58) Field of Classification Search
CPC .. F16K 37/0016; F16K 37/0008; F16K 31/53; F16K 31/535; F16K 31/54; Y10T 137/8275

(Continued)

(56) References Cited

U.S. PATENT DOCUMENTS 2,190,197 A * 2/1940 Simpson ............... F24D 19/081
  137/200
2,767,681 A * 10/1956 Pontius ............... F16K 37/0016
  116/277

(Continued)

FOREIGN PATENT DOCUMENTS

EP  0688991 A1 * 12/1995 ......... F16K 37/0016
EP  3026311 B1 *  6/2016 ............. F16K 31/60

(Continued)

OTHER PUBLICATIONS

English Machine Translation of KR20090124289 retreived from espacenet.com.*

*Primary Examiner* — Reinaldo Sanchez-Medina
*Assistant Examiner* — Nicole Gardner
(74) *Attorney, Agent, or Firm* — Harness, Dickey & Pierce, P.L.C.

(57) ABSTRACT

A valve shutter including an indicating unit configured to indicate opening angles of a valve of gas tank, the value coupled to the indicating unit, a first rotating unit configured to rotate the indicating unit up to a maximum opening angle of the valve, a second rotating unit configured to selectively interlock with the first rotating unit, a holding pin configured to be rotated by the second rotating unit, a shutting unit configured to prevent a rotation of the holding pin, a limit plate configured to be selectively rotated by the first rotating unit in a closing direction and an opening direction of the valve, and a stopper configured to restrict a rotation of the limit plate in the closing direction of the valve may be provided.

20 Claims, 17 Drawing Sheets

(51) Int. Cl.
*F16K 31/60* (2006.01)
*F17C 13/04* (2006.01)

(58) Field of Classification Search
USPC .............................................. 251/248, 250.5
See application file for complete search history.

(56) References Cited

U.S. PATENT DOCUMENTS

| | | | | |
|---|---|---|---|---|
| 3,334,654 | A | * | 8/1967 | Donner ................. F16K 31/504 137/553 |
| 3,346,006 | A | * | 10/1967 | Horton ................. A01C 23/024 137/501 |
| 3,902,375 | A | * | 9/1975 | Herrick .................... G05G 1/10 116/249 |
| 5,535,698 | A | * | 7/1996 | Trevisan ............. F16K 37/0008 116/277 |
| 5,769,118 | A | * | 6/1998 | Lenberg .................. F16K 31/60 116/277 |
| 6,019,129 | A | * | 2/2000 | Taha ..................... F16K 35/022 137/553 |
| 6,820,647 | B1 | * | 11/2004 | Grecco ................. F16K 31/041 137/137 |
| 7,472,721 | B2 | | 1/2009 | White et al. |
| 8,141,582 | B2 | | 3/2012 | Fukano et al. |
| 9,790,075 | B2 | * | 10/2017 | Menolotto ........... B65D 47/248 |
| 2004/0261872 | A1 | * | 12/2004 | Mermet ............ A61M 5/16881 138/42 |
| 2008/0066818 | A1 | * | 3/2008 | Nicolini .................... F16K 3/08 137/878 |
| 2016/0150627 | A1 | | 5/2016 | Howard et al. |

FOREIGN PATENT DOCUMENTS

| | | |
|---|---|---|
| JP | 2014-109340 A | 12/2014 |
| KR | 10-0679489 B1 | 2/2007 |
| KR | 20090124289 A | 12/2009 |
| KR | 10-1253666 B1 | 4/2013 |
| KR | 10-1510360 B | 4/2015 |

* cited by examiner

VALVE POSITION INDICATOR FOR VALVE SHUTTER

CROSS-RELATED APPLICATION

This application claims priority under 35 USC § 119 to Korean Patent Application No. 2016-0130601, filed on Oct. 10, 2016 in the Korean Intellectual Property Office (KIPO), the contents of which are herein incorporated by reference in their entirety.

BACKGROUND

1. Field

Example embodiments relate to valve shutters. More particularly, example embodiments relate to valve shutters configured to close a valve of a gas tank in emergency.

2. Description of the Related Art

Generally, a valve shutter may be installed at a valve of a gas tank. The valve shutter may close the valve in emergency. Further, the valve shutter may include an indicator for indicating an opening angle of the valve.

According to related arts, a range of the opening angle indicated by the indicator may be too narrow to accurately control a gas supply amount.

SUMMARY

Example embodiments provide valve shutters that may be capable of indicating a relatively wide opening angle of a valve to accurately control a gas supply amount.

According to an example embodiment, a valve shutter may include an indicating unit, a first rotating unit, a second rotating unit, a holding pin, a shutting unit, a limit plate, and a stopper. A valve of a gas tank may be coupled to the indicating unit. The indicating unit may be configured to indicate an opening angle of the valve. The first rotating unit may be configured to rotate the indicating unit up to a maximum opening angle of the valve. The second rotating unit may be configured to selectively interlock with the first rotating unit. The second rotating unit may be configured to rotate the holding pin. The shutting unit may be configured to prevent a rotation of the holding pin. The limit plate may be configured to be selectively rotated by the first rotating unit in an opening direction and a closing direction of the valve. The stopper may be configured to prevent a rotation of the limit plate in the closing direction of the valve.

According to an example embodiment, a valve shutter may include an indicating unit, a first rotating unit, a gear assembly, a handle, a second rotating unit, a holding pin, a shutting unit, a limit plate, and a stopper. The indicating unit may include an indicating body and an indicator. A valve of a gas tank may be coupled to the indicating body. The indicating body may include a displaying portion for indicating an opening angle of the valve. The indicator may surround the indicating body. The indicator may include a window defined therein and configured to expose a portion of the displaying portion for indicating a current opening angle of the valve. The first rotating unit may be configured to rotate the indicating unit up to a maximum opening angle of the valve. The gear assembly may be connected with the first rotating unit. The handle may be connected with the gear assembly. The second rotating unit may be selectively interlocked with the first rotating unit. The second rotating unit may be configured to rotate the holding pin. The shutting unit may be configured to prevent a rotation of the holding pin. The limit plate may be selectively rotated by the first rotating unit in an opening direction and a closing direction of the valve. The stopper may be configured to prevent a rotation of the limit plate in the closing direction of the valve.

According to an example embodiment, a valve shutter may include an indicating unit, a first rotating unit, a second rotating unit, a holding pin, a shutting unit, and a limit plate. The indicating unit may be configured to indicate opening angles of a valve of gas tank, the value coupled to the indicating unit. The first rotating unit may be configured to rotate the indicating unit up to a maximum opening angle of the valve. The second rotating unit may be selectively interlocked with the first rotating unit. The second rotating unit may be configured to rotate the holding pin. The shutting unit may be configured to prevent a rotation of the holding pin. The limit plate may be configured to be selectively rotated by the first rotating unit in a closing direction and an opening direction of the valve. The stopper may be configured to restrict a rotation of the limit plate in the closing direction of the valve once the limit plate makes contact with a surface of the stopper.

According to an example embodiment, the rotation of the limit plate in the opening direction of the valve may not be restricted. Thus, a range of the opening angle of the valve may increase. According to an example embodiment, the indicating unit may indicate the increased range of the opening angle more accurately, and thus a gas supply amount may be more precisely controlled.

BRIEF DESCRIPTION OF THE DRAWINGS

Example embodiments will be more clearly understood from the following detailed description taken in conjunction with the accompanying drawings.

FIG. 1 is a shut diagram illustrating a safety system of an equipment using a high pressure gas;

FIG. 2 is an exploded perspective view illustrating a valve shutter in accordance with an example embodiment;

FIG. 3 is an exploded perspective view illustrating a portion of the valve shutter in FIG. 2;

FIG. 4 is a perspective view illustrating a front of the valve shutter in FIG. 2;

FIG. 5 is a perspective view illustrating a rear of the valve shutter in FIG. 2;

FIG. 6 is a left side view illustrating the valve shutter in FIG. 2;

FIG. 7 is a front view illustrating the valve shutter in FIG. 2;

FIG. 8 is a perspective view illustrating the valve shutter in FIG. 2 viewed from a front upper position;

FIG. 9 is a perspective view illustrating the valve shutter in FIG. 2 viewed from a front lower position;

FIG. 10 is a cross-sectional view taken along a line X-X' in FIG. 7;

FIG. 11 is a cross-sectional view taken along a line XI-XI' in FIG. 6;

FIG. 12 is a cross-sectional view taken along a line XII-XII' in FIG. 6;

FIG. 13 is a cross-sectional view taken along a line XIII-XIII' in FIG. 12;

FIG. 14 is a cross-sectional view taken along a line XIV-XIV' in FIG. 7;

FIG. 15 is a plan view illustrating an indicating unit of the valve shutter in FIG. 2;

FIG. 16 is a cross-sectional view illustrating the indicating unit in FIG. 15;

FIG. 17 is a planar figure illustrating a displaying portion of the indicating unit in FIG. 15;

FIG. 18 is a perspective view illustrating an indicator of the indicating unit in FIG. 15; and FIGS. 19 and 20 are front views illustrating operations for displaying opening angles of a valve by the indicating unit in FIG. 15.

DETAILED DESCRIPTION

Hereinafter, some example embodiments will be explained in detail with reference to the accompanying drawings.

Figure 1:
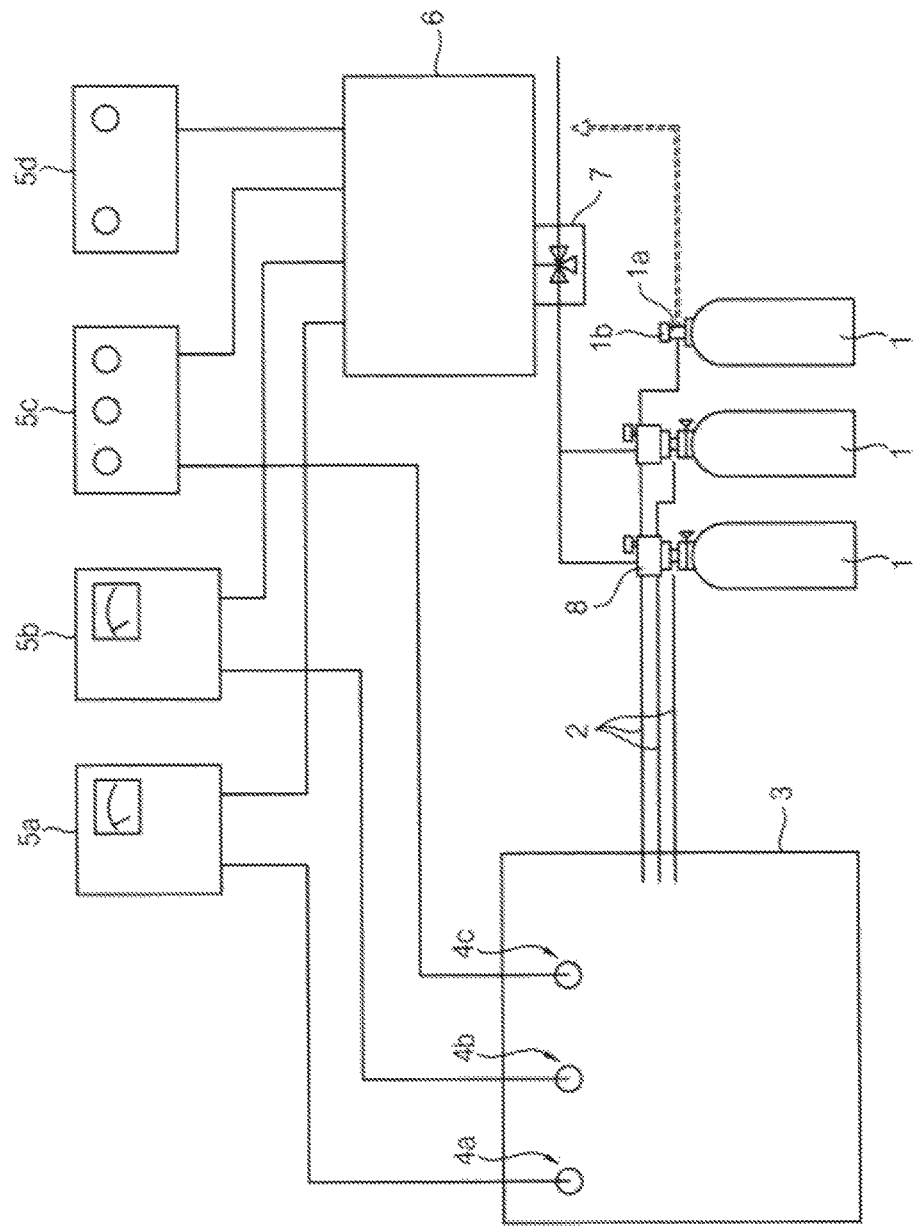
FIGS. 1 to 20 represent non-limiting, example embodiments as described herein.

FIG. 1 is a shut diagram illustrating a safety system of an equipment using a high pressure gas.

Referring to FIG. 1, a high pressure gas supply system may include a plurality of gas tanks 1, a valve 1a, a valve shutter 8, a controller 6, a plurality of sensors and a plurality of alarming units.

The gas tanks 1 may be connected with a process chamber 3 via gas lines 2. The valve 1a may be installed at an entrance of the gas tank 1. The valve shutter 8 may be connected to a handle 1b of the valve 1a.

The sensors may be arranged in the process chamber 3. The sensors may include a poisonous gas sensor 4a, a flammable gas sensor 4b, a temperature sensor 4c, an earthquake sensor, etc.

The alarming units may be configured to receive detection signals from the sensors 4a, 4b and 4c. The alarming units may include a poisonous gas alarming unit 5a, a flammable gas alarming unit 5b, a temperature alarming unit 5c, an earthquake alarming unit 5d, etc.

The controller 6 may receive detection signals from the alarming units 5a, 5b, 5c and 5d. The controller 6 may transmit control signals to a solenoid valve 7 to shut a compressed air supplied to the valve shutter 8.

Figure 2:
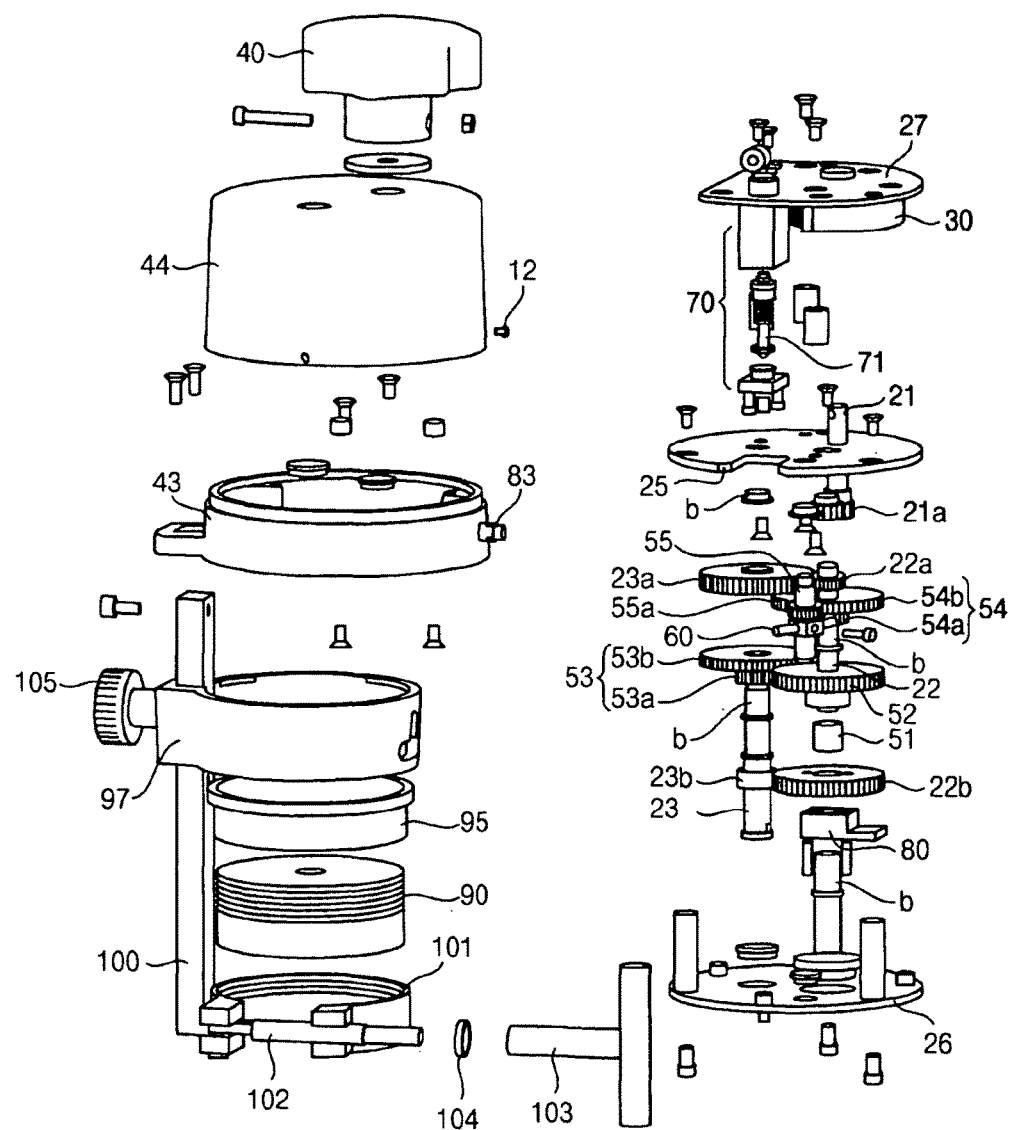
Figure 3:
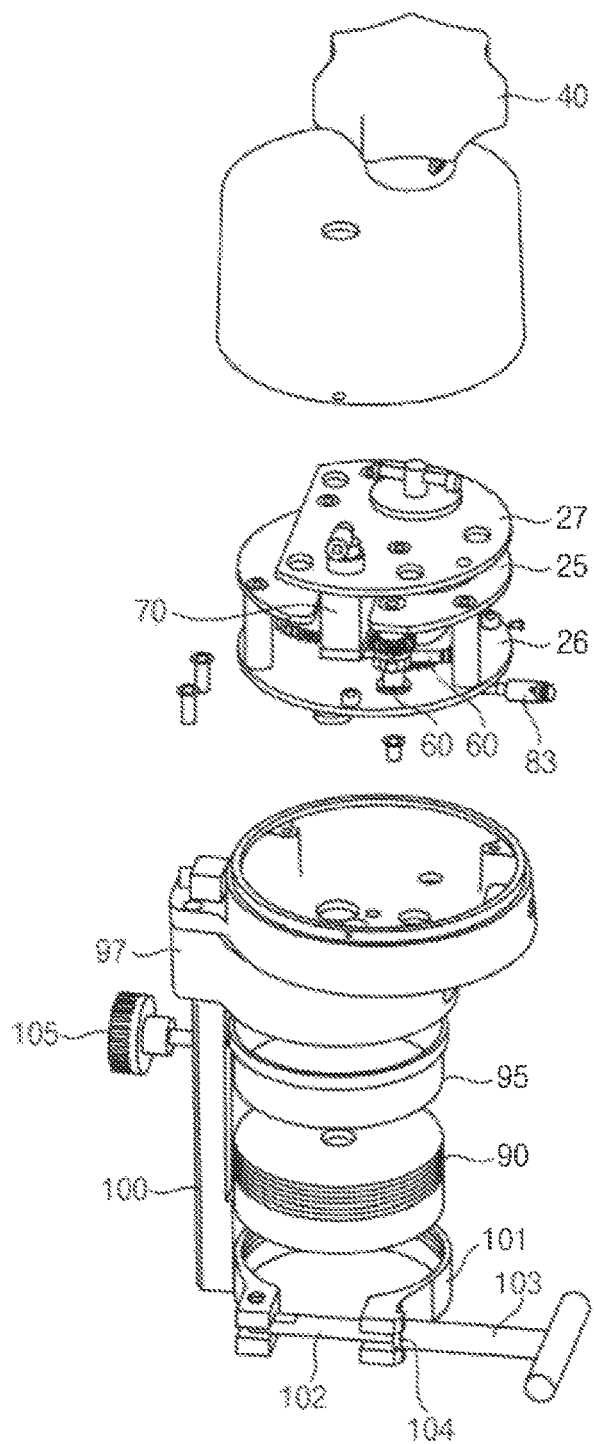
Figure 4:
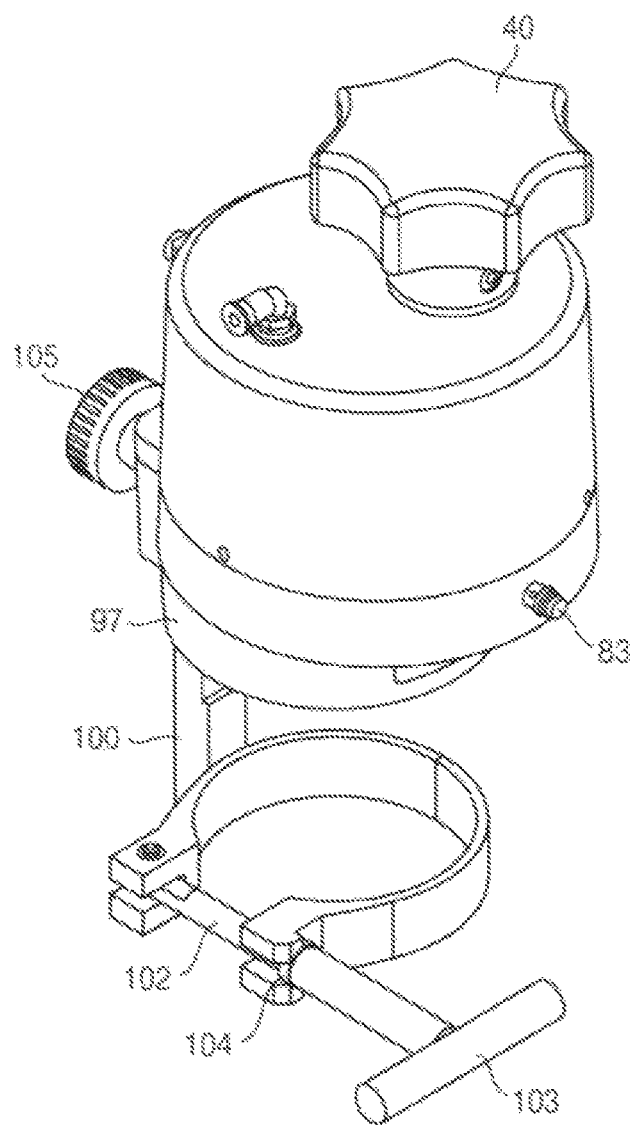
Figure 5:
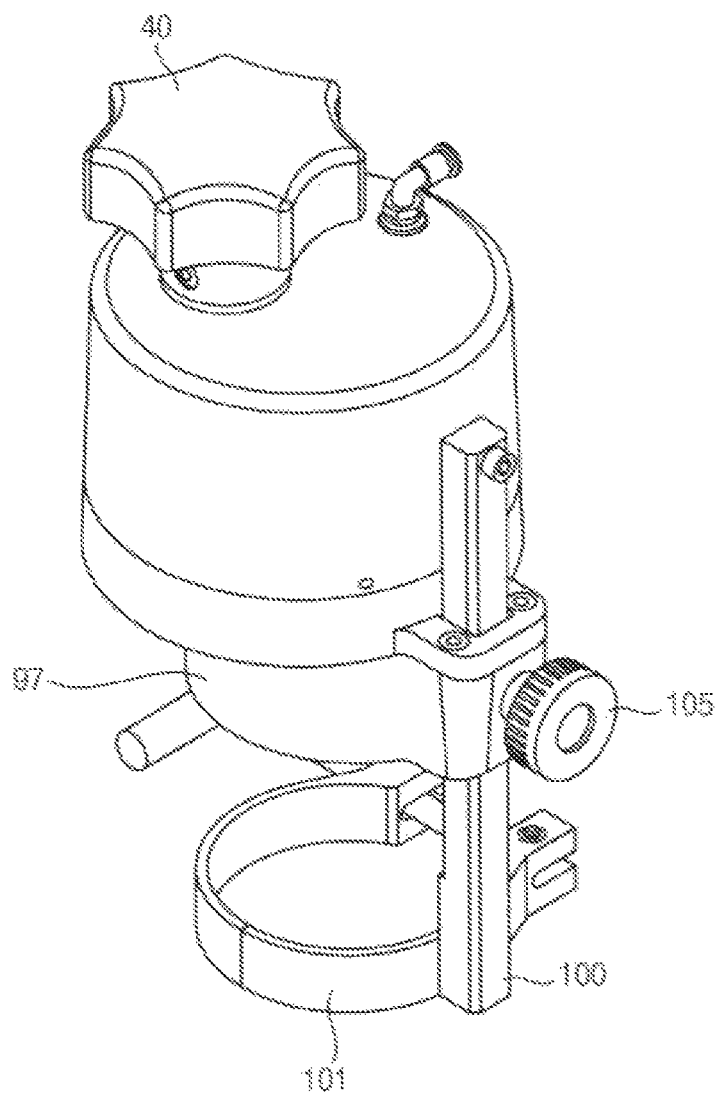
Figure 6:
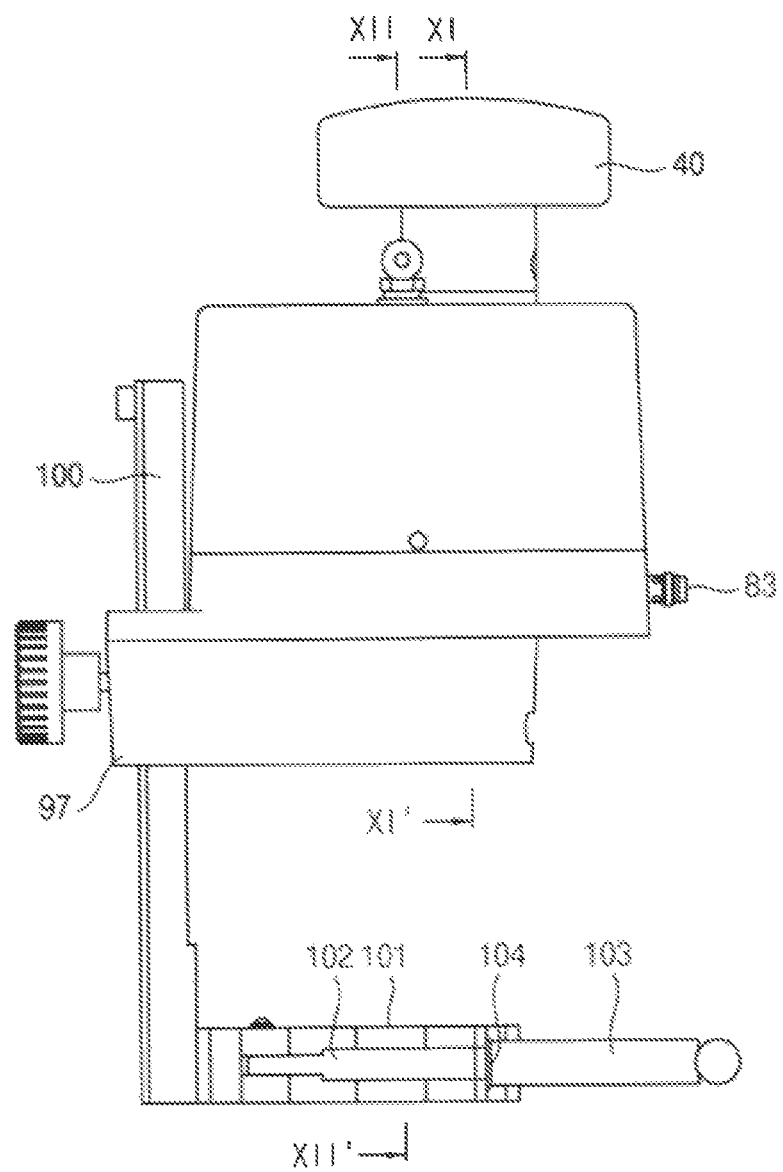
Figure 7:
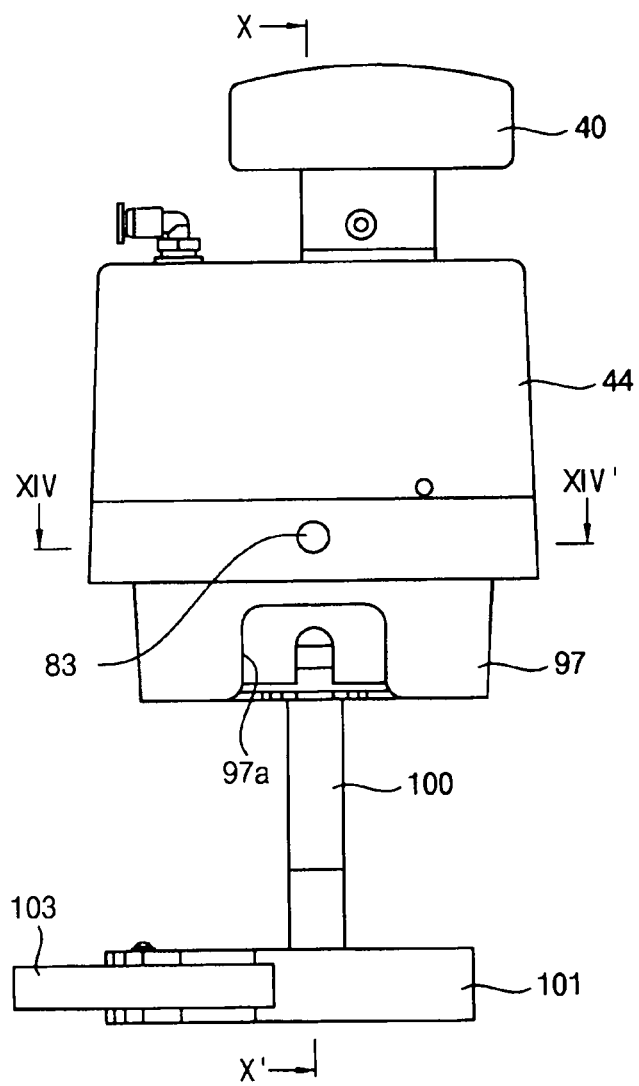
Figure 8:
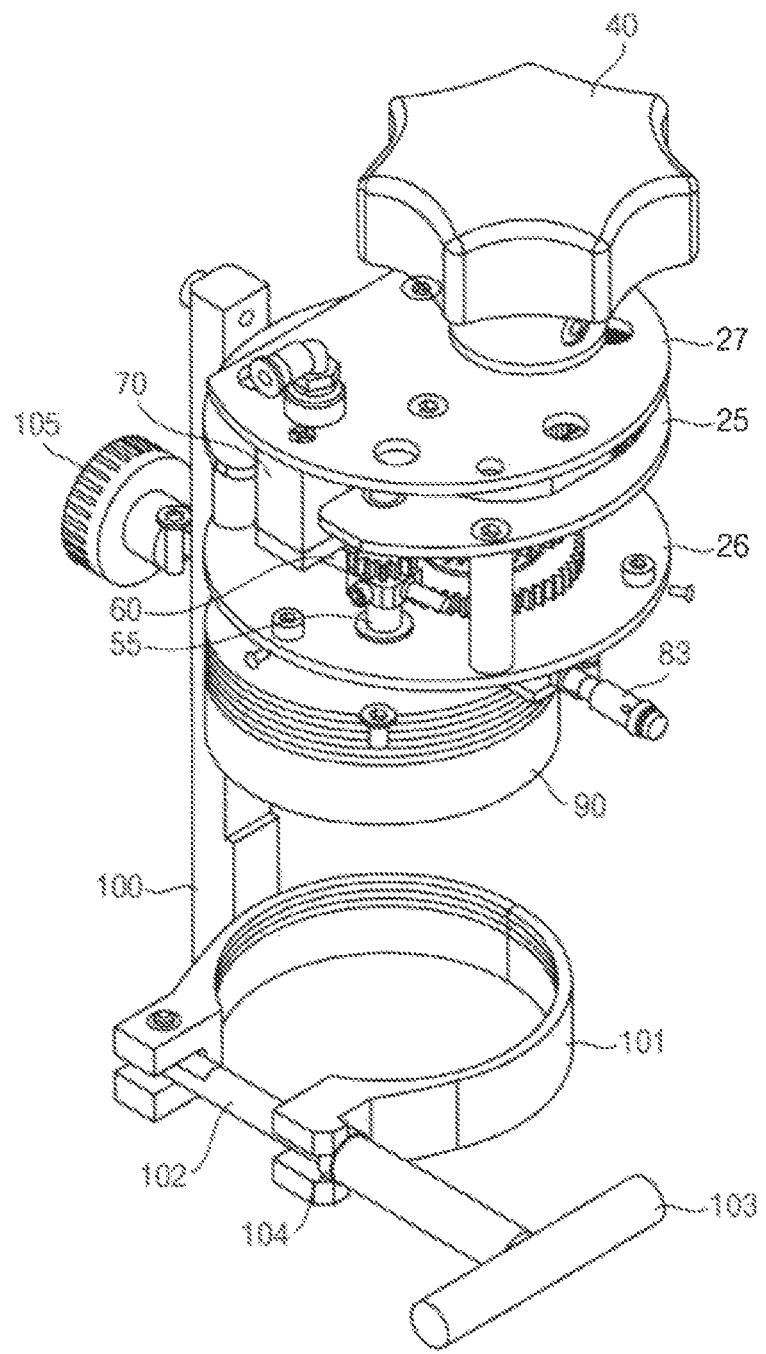
Figure 9:
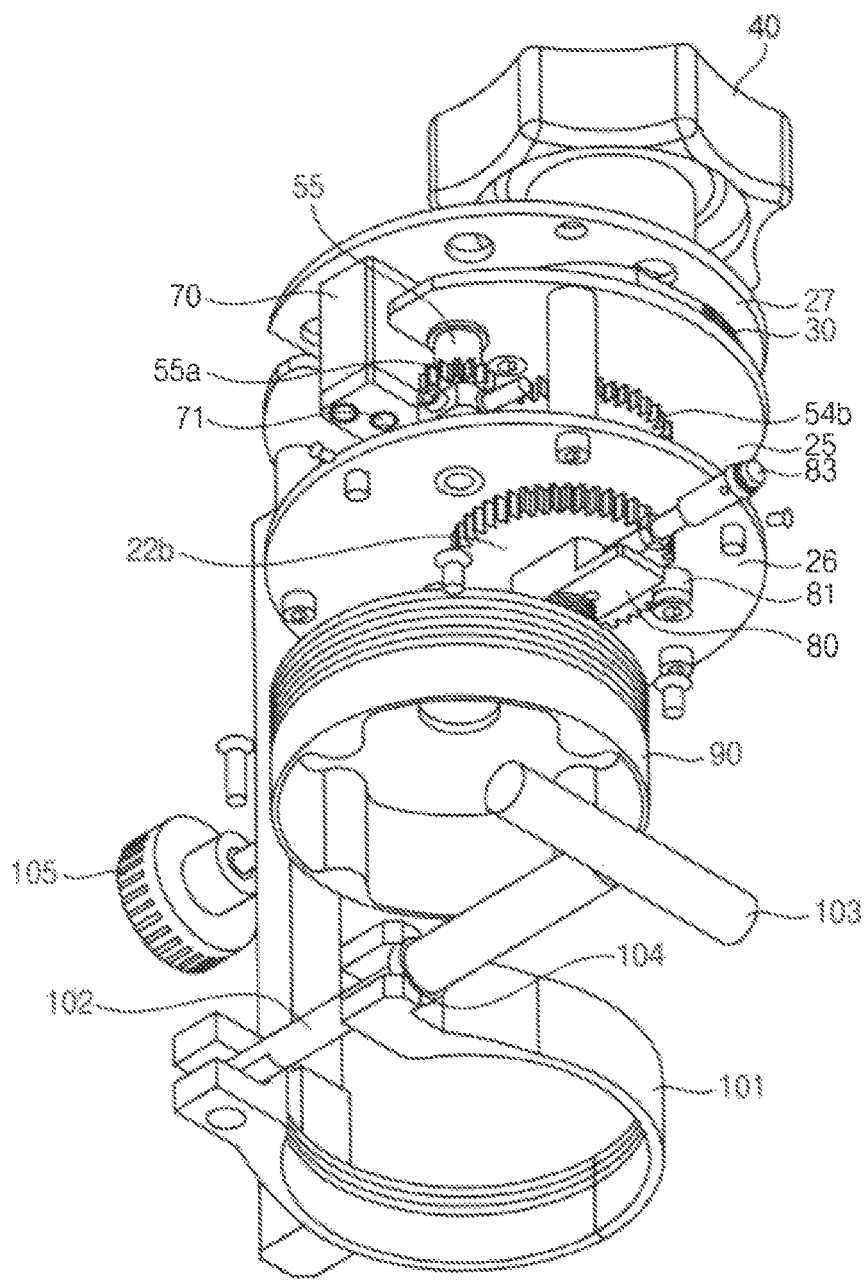
Figure 10:
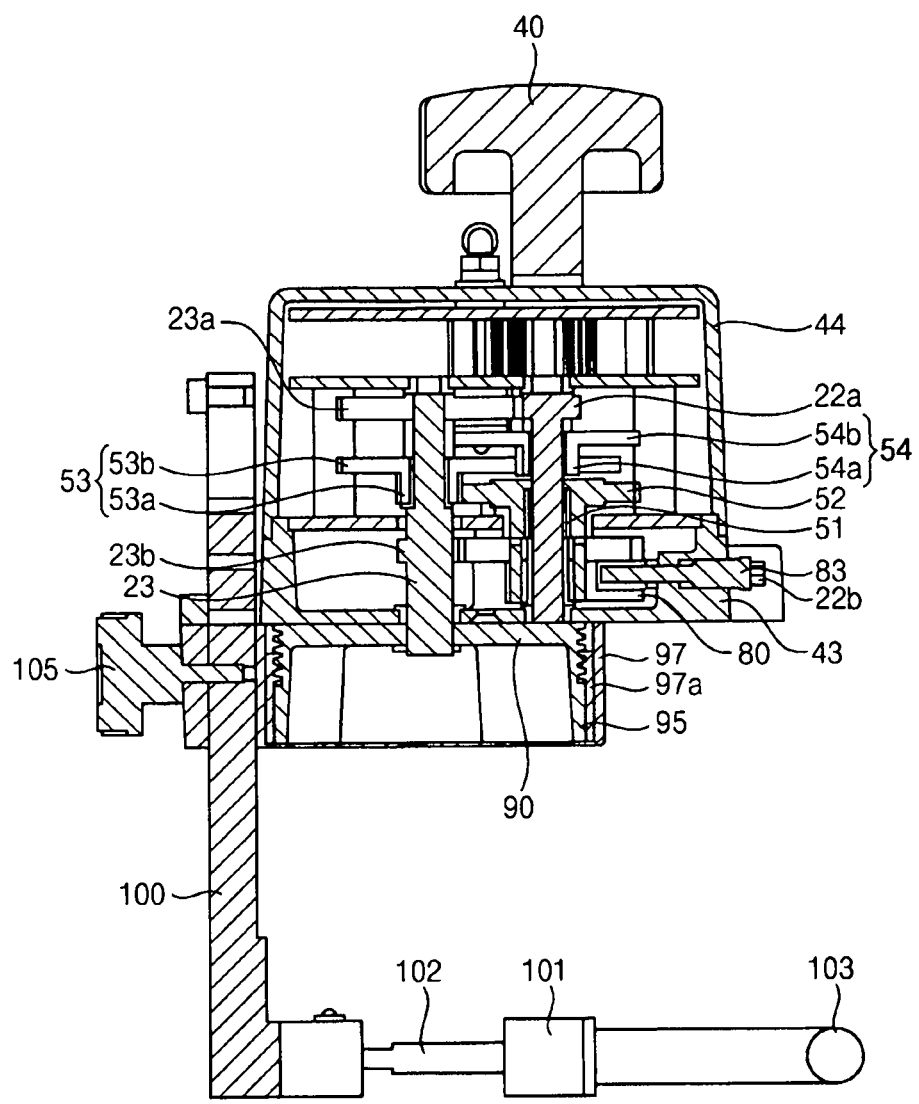
Figure 11:
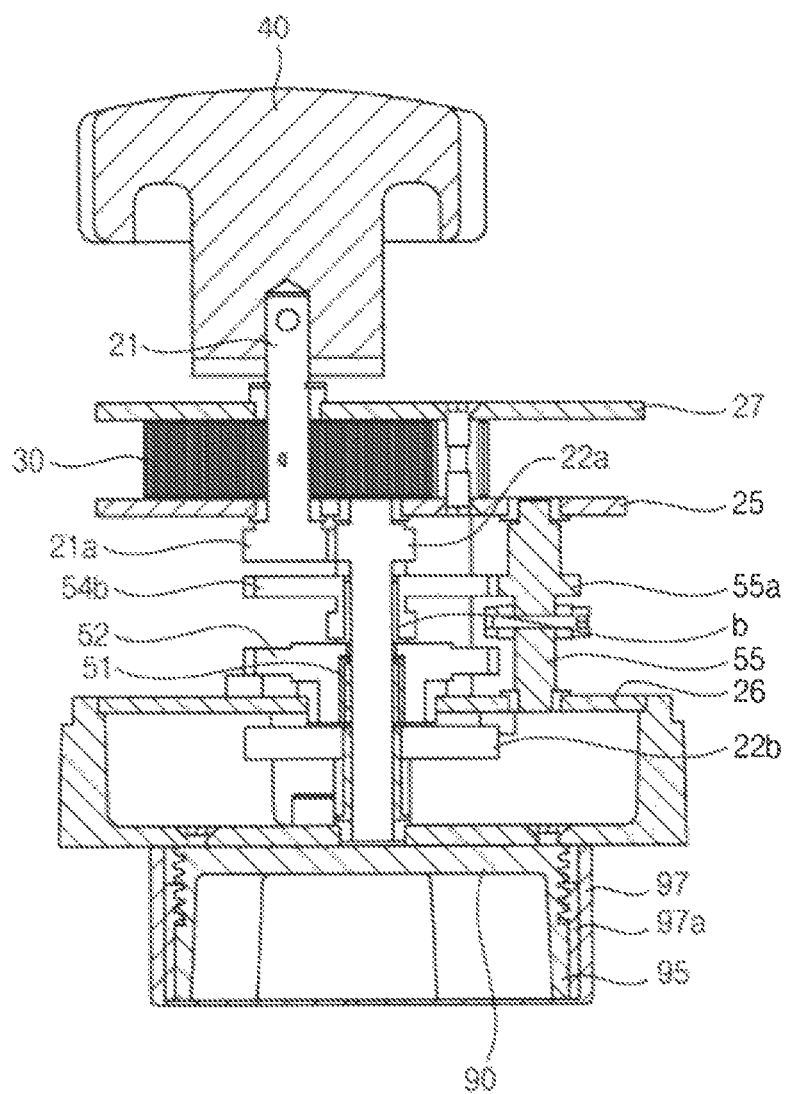
Figure 12:
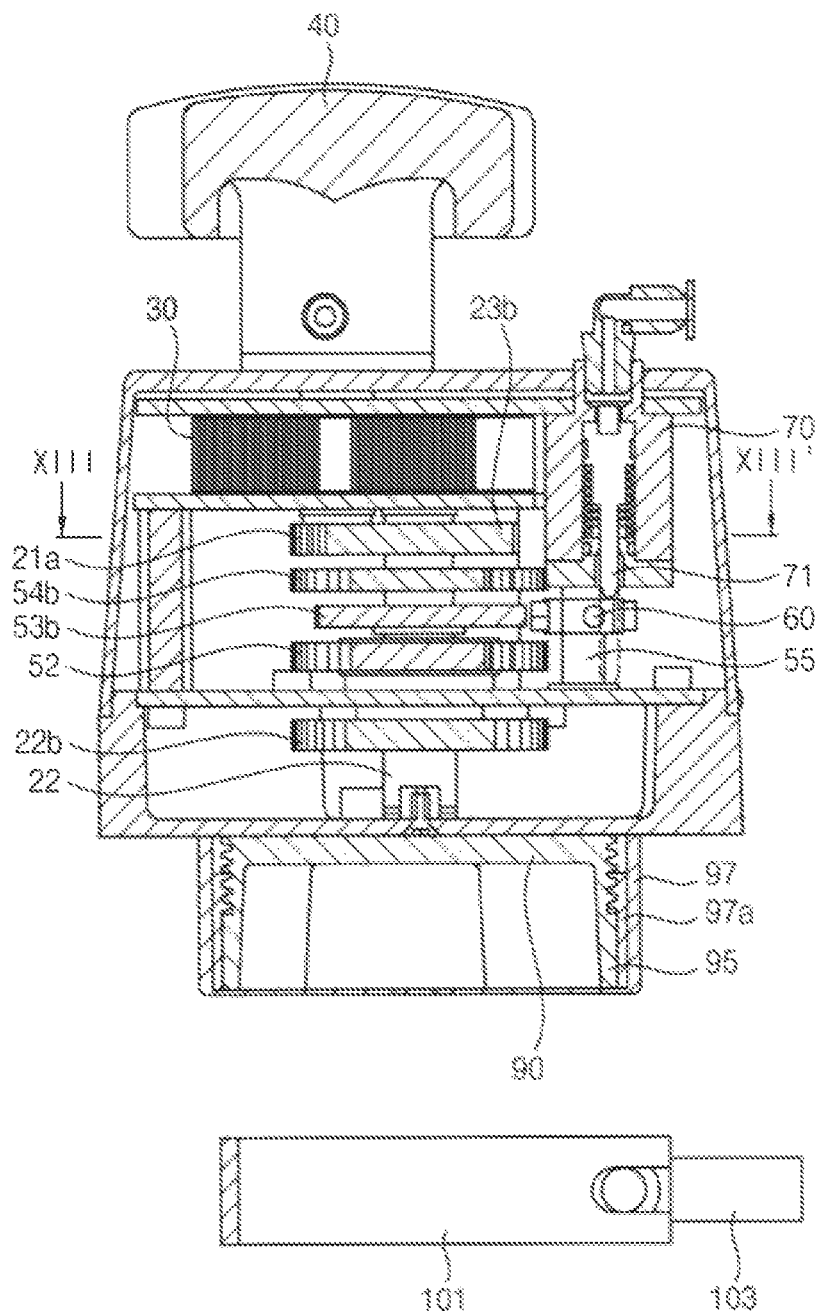
Figure 13:
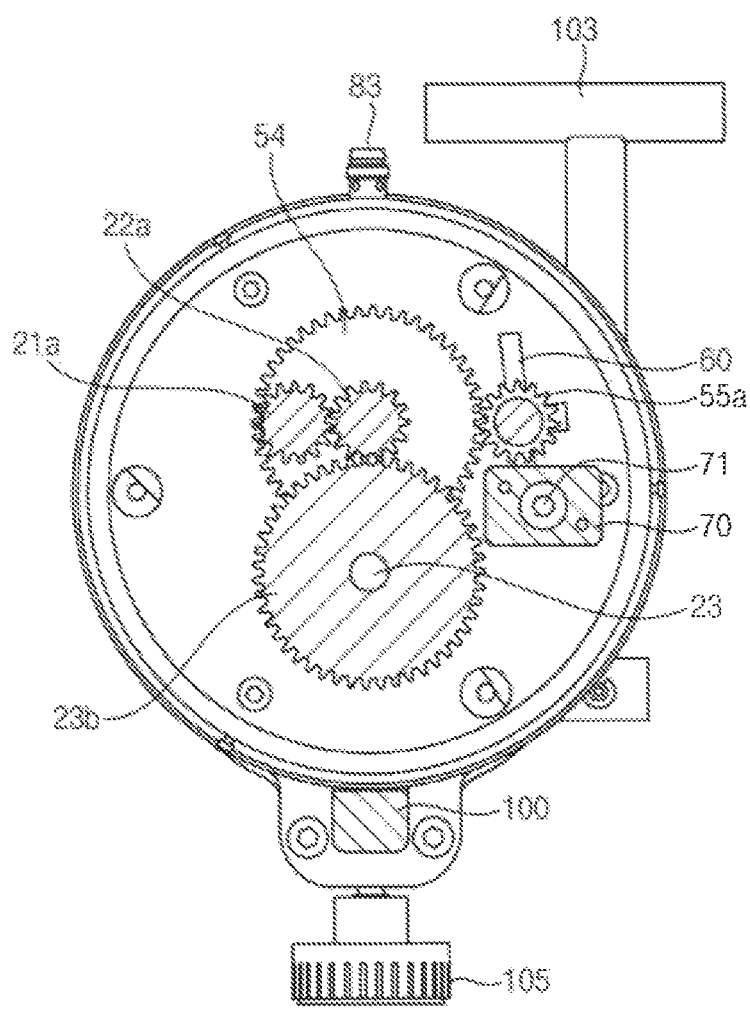
Figure 14:
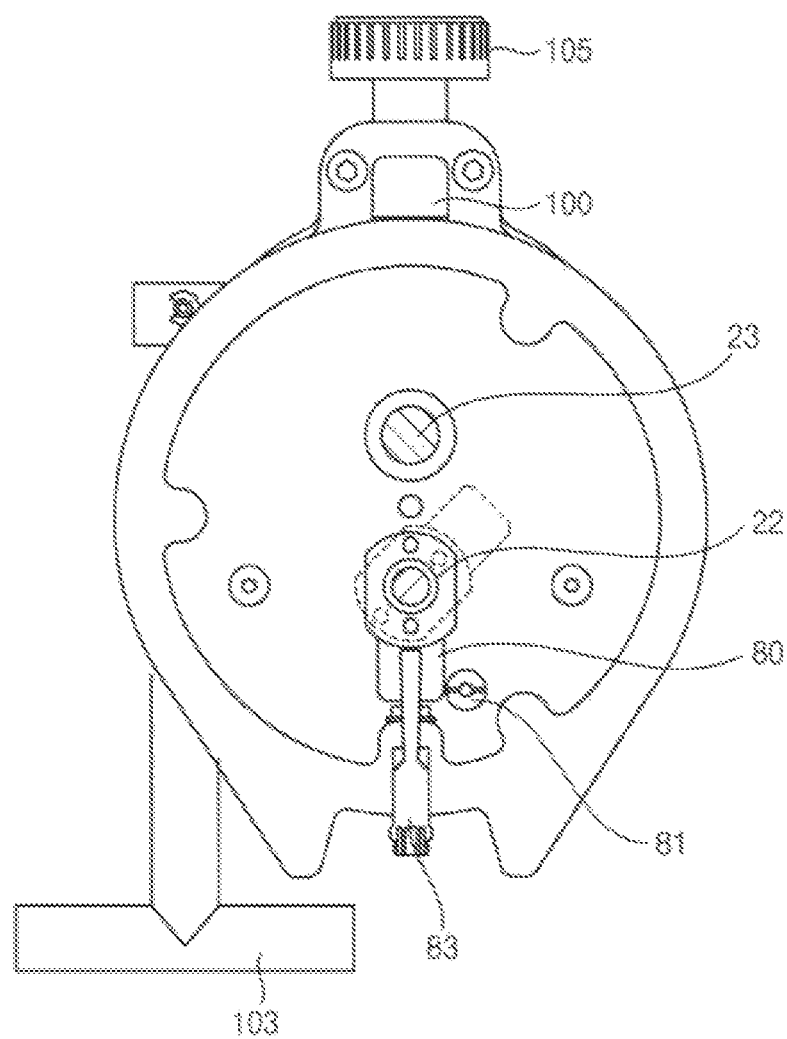
Figure 15:
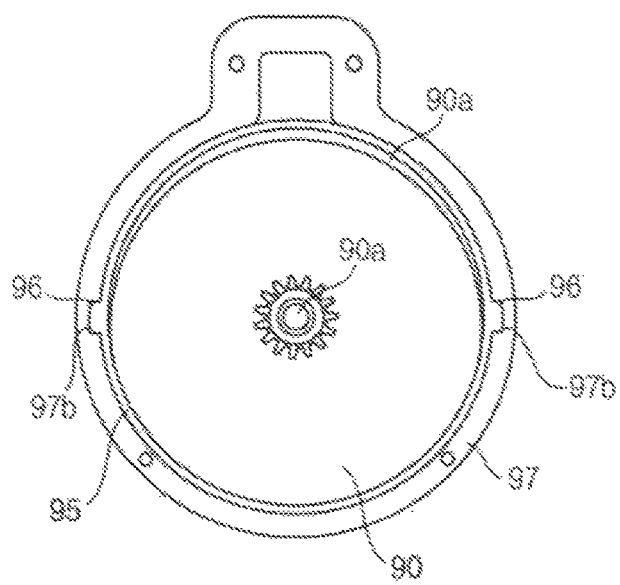
Figure 16:
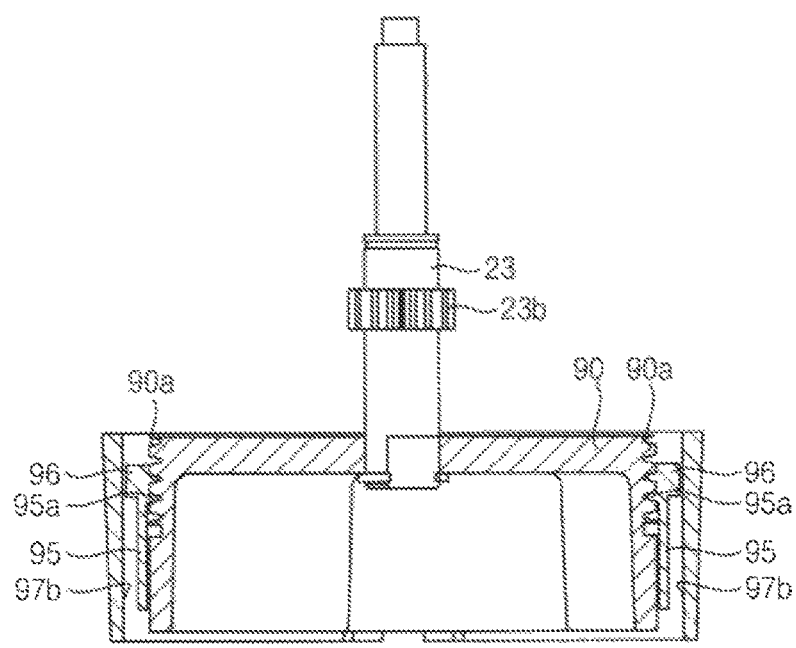
Figure 17:
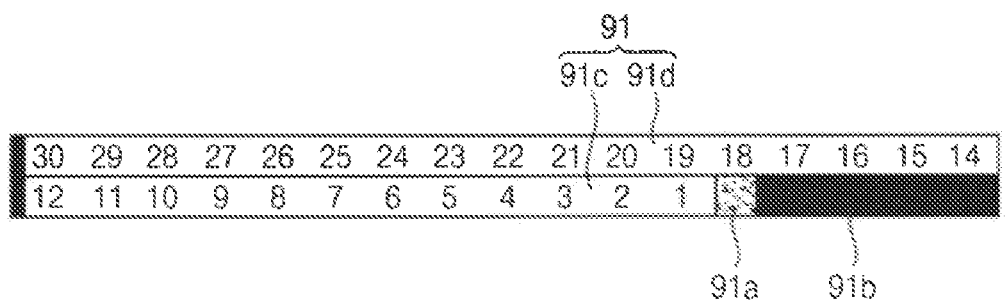
Figure 18:
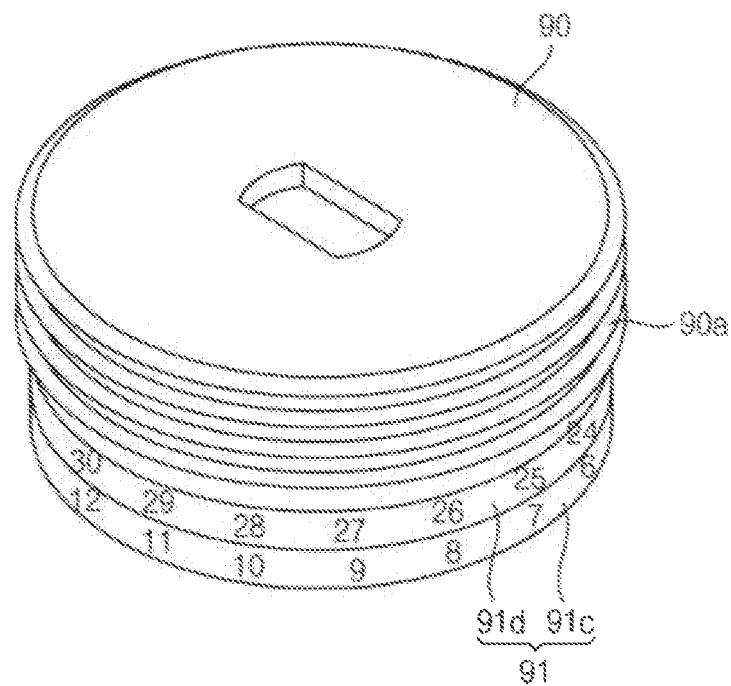
Figure 19:
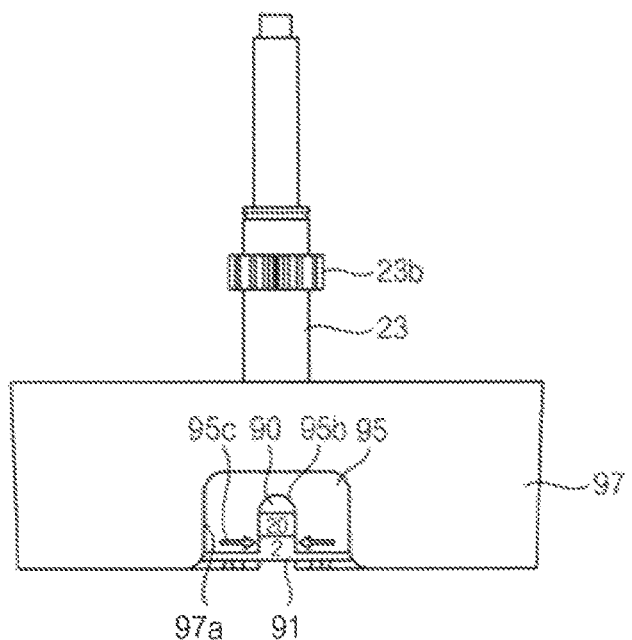
Figure 20:
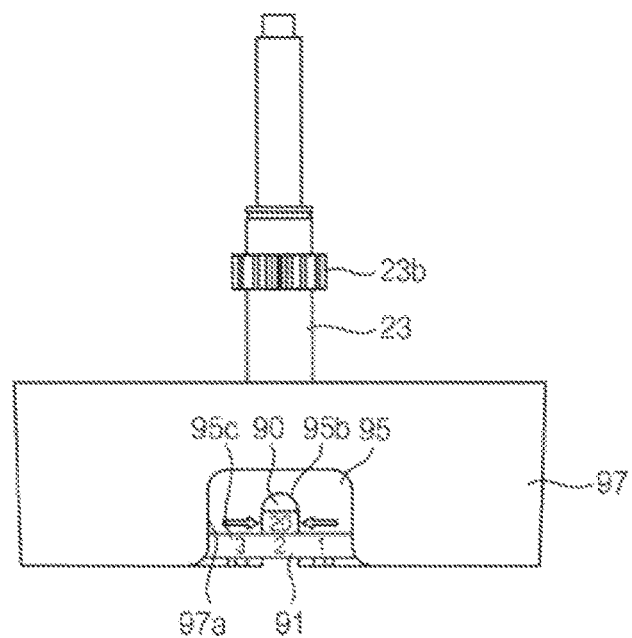

FIG. 2 is an exploded perspective view illustrating a valve shutter in accordance with an example embodiment. FIG. 3 is an exploded perspective view illustrating a portion of the valve shutter in FIG. 2. FIG. 4 is a perspective view illustrating a front of the valve shutter in FIG. 2. FIG. 5 is a perspective view illustrating a rear of the valve shutter in FIG. 2. FIG. 6 is a left side view illustrating the valve shutter in FIG. 2. FIG. 7 is a front view illustrating the valve shutter in FIG. 2. FIG. 8 is a perspective view illustrating the valve shutter in FIG. 2 viewed from a front upper position. FIG. 9 is a perspective view illustrating the valve shutter in FIG. 2 viewed from a front lower position. FIG. 10 is a cross-sectional view taken along a line X-X' in FIG. 7. FIG. 11 is a cross-sectional view taken along a line XI-XI' in FIG. 6. FIG. 12 is a cross-sectional view taken along a line XII-XII' in FIG. 6. FIG. 13 is a cross-sectional view taken along a line XIII-XIII' in FIG. 12. FIG. 14 is a cross-sectional view taken along a line XIV-XIV' in FIG. 7. FIG. 15 is a plan view illustrating an indicating unit of the valve shutter in FIG. 2. FIG. 16 is a cross-sectional view illustrating the indicating unit in FIG. 15. FIG. 17 is a planar figure illustrating a displaying portion of the indicating unit in FIG. 15. FIG. 18 is a perspective view illustrating an indicator of the indicating unit in FIG. 15. FIGS. 19 and 20 are front views illustrating operations for displaying portioning opening angles of a valve by the indicating unit in FIG. 15.

Referring to FIGS. 2 to 13, a valve shutter of this example embodiment may include a handle 40, a gear assembly (or alternatively, clockwork) 30, a first rotating unit, a second rotating unit, an indicating unit, a holding pin 60, a shutting unit 70, a limit plate 80 and a stopper 81.

The indicating unit may be connected movably in a vertical direction to a clamp column 100. The handle 1b of the valve 1a of the gas tank 1 may be coupled to the indicating unit. For example, the handle 1b may be inserted into the indicating unit. A clamp bar 102 of a clamp 101 may be fastened using a clamp handle 103 to couple the handle 1b to the indicating unit. A height of the indicating unit may be adjusted to place the handle 1b in the indicating unit. The indicating unit may be coupled to the clamp column 100 using a knob 105. A washer 104 may be interposed between the clamp handle 103 and the clamp bar 102. Thus, the valve 1a may be opened or closed by rotating the indicating unit.

The valve 1a may have a maximum opening angle when the entrance of the gas tank 1 is opened to its fullest extent. For example, when the valve 1a may be rotated at an angle of 720°, the entrance of the gas tank 1 may be opened to its fullest extent. Thus, the maximum opening angle of the valve 1a may be about 720°. Alternatively, the maximum opening angle of the valve 1a may be about 540°, about 720°, about 900°, about 1080°, etc.

The indicating unit may be rotated together with the valve 1a to indicate the opening angle of the valve 1a. The indicating unit may be rotated at an angle the same as substantially similar to a rotation angle of the valve 1a. Therefore, in the case that the maximum opening angle of the valve 1a is about 720°, the indicating unit may be rotated together with the valve 1a to indicate the opening angles of the valve 1a from about 0° to about 720°. That is, the indicating unit may be controlled to indicate an opening angle of the valve 1a.

The first rotating unit may be configured to rotate the indicating unit. The first rotating unit may rotate the indicating unit at an angle the same as or substantially similar to the rotation angle of the valve 1a. The first rotating unit may include an input shaft 21, a driving gear 21a, a middle shaft 22, a middle gear 22a, an output shaft 23, and a driven gear 23a.

The input shaft 21 may be vertically arranged over the indicating unit. The input shaft 21 may be rotatably supported by an upper plate 25. The driving gear 21a may be installed at a lower end of the input shaft 21. The driving gear 21a may be integrally formed with the input shaft 21.

The middle shaft 22 may be arranged under the input shaft 21. The middle shaft 22 may be parallel to the input shaft 21. The middle gear 22a may be installed at an upper end of the middle shaft 22. The middle gear 22a may be integrally formed with the middle shaft 22. The middle gear 22a may be engaged with the driving gear 21a.

The output shaft 23 may be arranged under the input shaft 21. The output shaft 23 may be parallel to the middle shaft 22. The output shaft 23 may be rotatably supported by a lower plate 26. The driven gear 23a may be installed at an upper end of the output shaft 23. The driven gear 23a may be integrally formed with the output shaft 23. The driven gear 23a may be engaged with the middle gear 22a. A lower end of the output shaft 23 may be connected to the indicating unit.

Therefore, a rotary force of the input shaft 21 may be transmitted to the indicating unit through the driving gear 21a, the middle gear 22a, the driven gear 23a and the output shaft 23. For example, in cases where the maximum opening angle of the valve 1a is about 540°, about 720°, about 900°, or about 1080°, a ratio of an RPM of the output shaft 23 to an RPM of the middle shaft 22 (e.g., a reduction gear ratio between the output shaft 23 and the middle shaft 22) may be about 1.5, about 2, about 2.5, or about 3. That is, the reduction gear ratio between the output shaft 23 and the middle shaft 22 may be no less than about 1.5. The reduction gear ratio may be embodied by adjusting a ration between the number of tooth of the middle gear 22a and the number of tooth of the driven gear 23a.

The gear assembly 30 may be connected to an upper end of the input shaft 21. A return spring (not shown) may resiliently support the gear assembly 30 toward a closing direction of the valve 1a. The gear assembly 30 may be rotatably connected with a handle plate 27.

The handle 40 may be connected to the gear assembly 30. A rotary force of the handle 40 may be transmitted to the input shaft 21 through the gear assembly 30. The handle 40 may be rotatably installed at an upper surface of an upper cover 40.

The shutting unit 70 may be vertically installed at a lower surface of the handle plate 27. The shutting unit 70 may include a pneumatic cylinder. A rod 71 of the pneumatic cylinder may move upwardly and downwardly.

The second rotating unit may be selectively interlocked with the first rotating unit. The second rotating unit may include a shutting gear 52, a first one-way clutch 51, a first idle gear 53, a second idle gear 54 and a holding shaft 55.

The shutting gear 52 may be installed at a lower end of the middle shaft 22. The one-way clutch 51 may be interposed between the shutting gear 52 and the middle shaft 22. The one-way clutch 51 may be configured to transmit the rotary force of the middle shaft 22 to the shutting gear 52 only in the closing direction of the valve 1a. That is, the one-way clutch 51 may not transmit the rotary force of the middle shaft 22 to the shutting gear 52 in the opening direction of the valve 1a.

The first idle gear 53 may be combined with an outer surface of the output shaft 23, while being configured to perform idling. A bush b may be interposed between the first idle gear 53 and the output shaft 23. The first idle gear 53 may include a first small gear 53a and a first large gear 53b. The first small gear 53a may be engaged with the shutting gear 52. The first large gear 53b may be integrally formed with an upper surface of the first small gear 53a.

The second idle gear 54 may be combined with an outer surface of the middle shaft 22, while being configured to perform idling. A bush b may be interposed between the second idle gear 54 and the middle shaft 22. The second idle gear 54 may include a second small gear 54a and a second large gear 54b. The second small gear 54a may be engaged with the first large gear 53b of the first idle gear 53. The second large gear 54b may be integrally formed with an upper surface of the second small gear 54a.

The holding shaft 55 may be connected with the second idle gear 54 via a pinion 55a. The pinion 55a may be integrally formed with the holding shaft 55. The pinion 55a may be engaged with the second large gear 54b of the second idle gear 54.

The holding pin 60 may be horizontally extended from the holding shaft 55. When the rod 71 of the shutting unit 70 downwardly moves, the rod 71 may make contact with the holding pin 60. The rod 71 may prevent the rotation of the holding pin 60 in the closing direction of the valve 1a.

The limit plate 80 may be rotated by the first rotating unit. The limit plate 80 may be rotatably installed at an outer surface of the middle shaft 22. A bush b may be interposed between the middle shaft 22 and the limit plate 80. A driving gear 23b may be installed at a lower end of the output shaft 23. A driven gear 22b may be idly combined with the outer surface of the middle shaft 22. The driving gear 23b may be engaged with the driven gear 22b. The limit plate 80 may be installed at a lower surface of the driven gear 22b. Thus, the rotary force of the output shaft 23 may be transmitted to the limit plate 80 through the driving gear 23b and the driven gear 22b.

Referring to FIG. 14, when the limit plate 80 makes contact with a first surface of the stopper 81 at a closing position as indicated by a solid line, the limit plate 80 may not rotate (or may rotate to a limited extent) in the closing direction of the valve 1a, while the rotation of the limit plate 80 in the opening direction of the valve 1a may not be restricted. That is, the valve shutter of this example embodiment may not include a stopper that is configured to restrict the rotation of the limit plate 80 in the opening direction of the valve 1a. Thus, the limit plate 80 may be rotated up to an angle of about 360° in the opening direction of the valve 1a until the limit plate 80 may make contact with the second surface of the stopper 81, the second surface different from the first surface. The rotation angle of the limit plate 80 in the opening direction of the valve 1a from the stopper 81 may be equal to or more than about 120°.

When the limit plate 80 is positioned at the closing position indicated by the solid line, a proximity sensor 83 may detect the limit plate 80. The closing of the valve 1a may be identified by a detected signal of the proximity sensor 83.

Because the rotation of the limit plate 80 in the opening direction of the valve 1a may not be restricted, the rotary force transmitted from the output shaft 23 to the indicating unit also may not be restricted. As a result, the indicating unit may indicate the whole opening angles of the valve 1a.

Referring to FIGS. 15 to 18, the indicating unit may include an indicating body 90, an indicator 95 and a casing 97.

The indicating body 90 may have a cylindrical shape. The lower end of the output shaft 23 may be connected to the indicating body 90. Thus, the indicating body 90 may be rotated together with the output shaft 23. The indicating body 90 may include a displaying portion 91 and a first threaded portion 90a.

The displaying portion 91 may be arranged at a lower portion of an outer surface of the indicating body 90. The displaying portion 91 may be configured to indirectly display the opening angles of the valve 1a. For example, the displaying portion 91 may display values obtained by dividing the opening angles of the valve 1a an angle amount calculated by dividing the maximum opening angle of the valve 1a by a certain number. For example, when the maximum opening angle of the valve 1a may is 720°, and 720 is divided by, for example, 30, a value corresponding to the maximum opening angle of the valve 1a is 31. The displaying portion 91 may display values ranging from 0 to 31. Thus, the angle amount between the values may be about 24°. A value 0 may indicate a position where the valve 1a is fixed to the indicating body 90. A value 30 may indicate a fully opened state of the valve 1a by rotating the valve 1a at an angle of about 720°.

The displaying portion 91 may include a first displaying region 91c and a second displaying region 91d. The first displaying region 91c may be positioned at a lower portion of the displaying portion 91. The first displaying region 91c may display a first section of the opening angles of the valve 1a. For example, the first displaying region 91c may display the values from a fixing position of the valve 1a to 13. In the case where an angle amount between the values is 24°, the first displaying region 91c may display the opening angles of the valve 1a from 0° to 312°. Further, a non-used region 91b may be arranged in the first displaying region 91c.

The second displaying region 91d may be positioned over the first displaying region 91c. The second displaying region 91d may display a second section (which excludes the first section) of the opening angles of the valve 1a. The second displaying region 91d may display the values from 14 to 30. In the case where an angle amount between the values is 24°, the second displaying region 91d may display the opening angles of the valve from 312° to 720°.

Alternatively, the displaying portion 91 may include a single line type displaying region or at least three line type displaying region. The shape of the displaying portion 91 may vary in accordance with the maximum opening angle of the valve 1a.

The first threaded portion 90a may be formed on an upper portion of the outer surface of the indicating body 90. The first threaded portion 90a may have a length capable of surrounding the outer surface of the indicating body 90 at least twice.

The indicator 95 may be configured to indicate a current opening angle of the valve 1a. The indicator 95 may have a shape configured to surround the outer surface of the indicating body 90. The indicator 95 may include a second threaded portion 95a, a window 95b, an arrow 95c and a guide 96.

The second threaded portion 95a may be formed on an inner surface of the indicator 95. The second threaded portion 95a may be combined with the first threaded portion 90a. Thus, when the indicating body 90 may be rotated by the output shaft 23, the indicator 95 may move upwardly or downwardly by the second threaded portion 95a combined with the first threaded portion 90a.

The window 95b may be formed through a side surface of the indicator 95. The window 95b may be configured to expose a portion of the displaying portion 91 in the indicating body 90. A value in the displaying portion 91 exposed through the window 95 may correspond to the current opening angle of the valve 1a.

For example, a value in the first displaying region 91c and a value in the second displaying region 91d may be exposed through the window 95b. In such case, it may be difficult to identify which one of the values exposed through the window 95b actually corresponds to the current opening angle of the valve 1a.

The arrow 95c may be arranged at the outer surface of the indicator 95 at both sides of the window 95b. As mentioned above, because the indicator 95 may move upwardly or downwardly by the rotation of the indicating body 90, the arrow 95c may also move upwardly or downwardly together with the indicator 95 to indicate the first displaying region 91c or the second displaying region 91d. Therefore, by checking a value in any one of the first and second displaying regions 91c and 91d indicated by the arrow 95c, the current opening angle of the valve 1a can be accurately identified.

The guide 96 may be horizontally formed on the outer surface of the indicator 95. The guide 96 may be positioned over the outer surface of the indicator 95.

The casing 97 may be configured to receive the indicating body 90 and the indicator 95. The casing 97 may be movably connected with the clamp column 100 in the vertical direction. The casing 97 may have a cylindrical shape having opened upper and lower surfaces.

The casing 97 may include an opening 97a and a guide groove 97b. The opening 97a may be formed through a side surface of the casing 97 to expose the window 95b and the arrow 95c. The guide groove 97b may be configured to receive the guide 96. The guide 96 may move upwardly and downwardly in the guide groove 97b. Thus, the upward and downward movements of the indicator 95 may be supported by the guide 96 and the guide groove 97b.

Hereinafter, operations of the valve shutter in accordance with some example embodiments may be illustrated in detail.

A compressed air may be supplied to the pneumatic cylinder (or shutting unit) 70 to downwardly move the rod 71. The rod 71 may make contact with the holding pin 60 to prevent the rotation of the hold pin 60 in the closing direction of the valve 1a.

The handle 40 may rotate in the opening direction of the valve 1a. The rotary force of the handle 40 may be transmitted to the indicating body 90 through the gear assembly 30, the input shaft 21, the driving gear 21a, the middle gear 22a, the driven gear 23a and the output shaft 23.

The indicating body 90 may be rotated at an angle of about 90° to expose the fixed position 91a of the displaying portion 91 through the window 95b. The handle 1b of the valve 1a of the gas tank 1 may be coupled to the indicating body 90. The indicating body 90 may receive the force of the returning spring applied to the gear assembly 30 in the closing direction of the valve 1a. However, because the rotation of the holding pin 60 may be blocked by the rod 71, the indicating body 90 may not rotate in the closing direction of the valve 1a.

The rotary force of the output shaft 23 may be transmitted to the limit plate 80 through the driving gear 23b and the driven gear 22b. Thus, the limit plate 80 may be rotated from the stopper 81 in the opening direction of the valve 1a. Because the rotation of the limit plate 80 in the opening direction of the valve 1a may not be restricted, the limit plate 80 may rotate at an angle of about 360°.

The opening angles of the valve 1a may be indicated by the values of the displaying portion 91. In a case where the maximum opening angle of the valve 1a is about 720°, the first section in the opening angles of the valve 1a may be indicated by the values of the first displaying region 91c. As shown in FIG. 19, the indicator 95 may be positioned at the lower region of the indicating body 90 so that the arrow 95c may indicate the values of the first displaying region 91c.

The indicating body 90 may enter into the second section in the opening angles of the valve 1a. The indicator 95 combined with the indicating body 90 may move upwardly. Thus, as shown in FIG. 20, the arrow 95c may indicate the values of the second displaying region 91d. Therefore, the gas in the gas tank 1 may be supplied to the process chamber 3 through the opened valve 1a.

When the emergency such as a gas leakage occurs, the sensors including the poisonous gas sensor 4a, the flammable gas sensor 4b, the temperature sensor 4c, the earthquake sensor, etc., may detect the emergency. The detected signals may be transmitted to the alarming units including the poisonous gas alarming unit 5a, the flammable gas alarming unit 5b, the temperature alarming unit 5c, the earthquake alarming unit 5d, etc. The alarming units may transmit the control signals to the controller 6.

The controller 6 may close the solenoid valve 7 to block the supply of the compressed air to the pneumatic cylinder 70. The rod 71 may move upwardly into the pneumatic cylinder 70. Thus, the rotation restriction of the holding pin 60 may be released.

The returning force of the returning spring applied to the gear assembly 30 may be transmitted to the indicating body 90 through the input shaft 21, the driving gear 21a, the middle gear 22a, the driven gear 23a and the output shaft 23. Because the middle shaft 22 may be rotated in the closing direction of the valve 1a, the rotary force of the middle shaft 22 may be transmitted to the holding shaft 55 through the shutting gear 52, the first idle gear 53, the second idle gear 54 and the pinion 55a. Thus, the holding pin 60 may rotate in the closing direction of the valve 1a.

The limit plate 80 may rotate in the closing direction of the valve 1a to the stopper 81. When the limit plate 80 is positioned at the fixed position, the valve 1a of the gas tank 1 may be fully closed. The proximity sensor 83 may detect the limit plate 80 at the fixed position. The detected signal may be transmitted to a worker through the alarming units. Therefore, the worker may securely repair the system.

According to some example embodiments, the rotation of the limit plate in the opening direction of the valve may not be restricted. Thus, an indicated range of the opening angle of the valve may be increased. As a result, the indicating unit may accurately indicate the increased range of the opening angle so that a gas supply amount may be precisely controlled.

The foregoing is illustrative of some example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A valve shutter comprising:
    an indicating unit configured to indicate opening angles of a valve of a gas tank, the valve coupled to the indicating unit;
    a first rotating unit configured to rotate the indicating unit up to a maximum opening angle of the valve;
    a second rotating unit configured to selectively interlock with the first rotating unit;
    a holding pin configured to be rotated by the second rotating unit;
    a shutting unit configured to prevent a rotation of the holding pin;
    a limit plate configured to be selectively rotated by the first rotating unit in a closing direction and an opening direction of the valve; and
    a stopper configured to restrict a rotation of the limit plate in the closing direction of the valve,
    wherein the valve shutter does not include a stopper configured to restrict a rotation of the limit plate in the opening direction of the valve.

2. The valve shutter of claim 1, wherein the indicating unit comprises:
    an indicating body connected with the first rotating unit, the indicating unit including a displaying portion, the displaying portion configured to display the opening angles of the valve; and
    an indicator surrounding an outer surface of the indicating body, the indicator including a window, the window configured to expose a portion of the displaying portion, the displaying portion configured to indicate the opening angles of the valve.

3. The valve shutter of claim 2, wherein the displaying portion comprises:
    a first displaying region arranged on the outer surface of the indicating body, the first displaying region configured to display a first section of the opening angles of the valve; and
    a second displaying region arranged on the outer surface of the indicating body, the second displaying region above the first displaying region when the valve shutter is installed upright such that a handle of the valve shutter is at a top of the valve shutter, the second displaying region configured to display a second section of the opening angles of the valve exclusive of the first section of the opening angles of the valve.

4. The valve shutter of claim 3, wherein:
    the indicating body comprises a first threaded portion, the first threaded portion on the outer surface of the indicating body; and
    the indicator comprises a second threaded portion and an arrow, the second threaded portion defined on an inner surface of the indicator, the first threaded portion and the second threaded portion combined with each other and configured to move the indicator upwardly and downwardly by a rotation of the indicating body, and the arrow configured to selectively indicate one region from among the first displaying region and the second displaying region.

5. The valve shutter of claim 4, wherein the indicating unit further comprises a casing, the casing configured to receive the indicator.

6. The valve shutter of claim 5, wherein:
    the indicator further comprises a guide, the guide defined on the outer surface of the indicator; and
    the casing includes a guide groove, the guide configured to move upwardly and downwardly in the guide groove.

7. The valve shutter of claim 5, wherein the casing comprises an opening defined at a side surface of the casing, and the casing is configured to expose the window and the arrow through the opening.

8. The valve shutter of claim 1, wherein a rotation angle of the limit plate in the opening direction is equal to or more than 120°.

9. The valve shutter of claim 1, further comprising:
    a driving gear configured to be rotated by the first rotating unit; and
    a driven gear configured to be engaged with the driving gear, the limit plate being at a bottom surface of the driven gear when the valve shutter is installed upright such that a handle of the valve shutter is at a top of the valve shutter.

10. The valve shutter of claim 1, further comprising:
    a gear assembly connected with the first rotating unit; and
    a handle connected with the gear assembly.

11. The valve shutter of claim 1, wherein the first rotating unit comprises:

when the valve shutter is installed upright such that a handle of the valve shutter is at a top of the valve shutter, an input shaft including a driving gear;

a middle shaft under the input shaft, the middle shaft including a middle gear, the middle gear engaged with the driving gear; and an output shaft under the input shaft, the output shaft including a driven gear engaged with the middle gear, the output shaft connected with the indicating unit at a bottom end thereof.

12. The valve shutter of claim 11, wherein a reduction gear ratio of the output shaft with respect to the middle shaft is no less than 1.5.

13. The valve shutter of claim 11, wherein the second rotating unit comprises:

a shutting gear rotatably on the middle shaft;

a one-way clutch between the middle shaft and the shutting gear, the one-way clutch configured to transmit a rotary force of the middle shaft to the shutting gear only in the closing direction of the valve;

a first idle gear combined with the output shaft, the first idle gear configured to be engaged with the shutting gear, the first idle gear configured to perform idling;

a second idle gear combined with the middle shaft, the second idle gear configured to be engaged with the first idle gear, the second idle gear configured to perform idling; and a holding shaft engaged with the second idle gear via a pinion, the holding shaft including the holding pin extending therefrom.

14. A valve shutter comprising:

an indicating unit including an indicating body and an indicator, the indicating body coupled to a valve of a gas tank, the indicating body including a displaying portion, the displaying portion configured to display opening angles of the valve, the indicator surrounding an outer surface of the indicating body, the indicator including a window defined therein, the window configured to expose a portion of the displaying portion, the displaying portion configured to indicate the opening angles of the valve;

a first rotating unit configured to rotate the indicating unit up to a maximum opening angle of the valve;

a gear assembly connected with the first rotating unit;

a handle connected with the gear assembly;

a second rotating unit selectively interlocked with the first rotating unit;

a holding pin configured to be rotated by the second rotating unit;

a shutting unit configured to prevent a rotation of the holding pin;

a limit plate configured to be selectively rotated by the first rotating unit in a closing direction and an opening direction of the valve; and a stopper configured to restrict a rotation of the limit plate in the closing direction of the valve, wherein the valve shutter does not include a stopper configured to restrict a rotation of the limit plate in the opening direction of the valve.

15. The valve shutter of claim 14, wherein the displaying portion comprises, a first displaying region on the outer surface of the indicating body, the first displaying region configured to display a first section of the opening angles of the valve, and a second displaying region on the outer surface of the indicating body, the second displaying region above the first displaying region when the valve shutter is installed upright such that a handle of the valve shutter is at a top of the valve shutter, the second displaying region configured to display a second section of the opening angles of the valve, and the indicating body comprises, a first threaded portion on the outer surface of the indicating body, and the indicator including a second threaded portion and an arrow, the second threaded portion defined on an inner surface of the indicator, the first threaded portion and the second threaded portion combined with each other and configured to move the indicator upwardly and downwardly by a rotation of the indicating body, the arrow configured to selectively indicate one region from among the first displaying region and the second displaying region.

16. A valve shutter comprising:

an indicating unit configured to indicate opening angles of a valve of a gas tank, the valve coupled to the indicating unit;

a first rotating unit configured to rotate the indicating unit up to a maximum opening angle of the valve;

a second rotating unit selectively interlocked with the first rotating unit;

a holding pin configured to be rotated by the second rotating unit;

a shutting unit configured to prevent a rotation of the holding pin;

a limit plate configured to be selectively rotated by the first rotating unit in a closing direction and an opening direction of the valve; and a stopper configured to restrict a rotation of the limit plate in the closing direction of the valve once the limit plate makes contact with a surface of the stopper, wherein the valve shutter does not include a stopper configured to restrict a rotation of the limit plate in the opening direction of the valve.

17. The valve shutter of claim 16, wherein the indicating unit includes an indicating body and an indicator, the indicating body coupled to the valve of the gas tank, the indicating body including a displaying portion, the displaying portion configured to display the opening angles of the valve, the indicator surrounding an outer surface of the indicating body, the indicator including a window defined therein, the window configured to expose a portion of the displaying portion, the displaying portion configured to indicate the opening angles of the valve.

18. The valve shutter of claim 17, wherein the displaying portion comprises:

a first displaying region on the outer surface of the indicating body, the first displaying region configured to display a first section of the opening angles of the valve; and a second displaying region on the outer surface of the indicating body, the second displaying region above the first displaying region when the valve shutter is installed upright such that a handle of the valve shutter is at a top of the valve shutter, the second displaying region configured to display a second section of the opening angles of the valve.

19. The valve shutter of claim 18, wherein the indicating body comprises a first threaded portion, the first threaded portion on the outer surface of the indicating body, and the indicator comprises a second threaded portion and an arrow, the second threaded portion defined on an inner surface of the indicator, the first threaded portion and the second threaded portion combined with each other and configured to move the indicator upwardly and downwardly by a rotation of the indicating body, and the arrow configured to selectively indicate one region from among the first displaying region and the second displaying region.

20. The valve shutter of claim 19, wherein the indicator further comprises a guide, the guide defined on the outer surface of the indicator, and the indicating unit further comprises a casing, the casing including a guide groove and an opening defined at a side surface thereof, the guide groove configured to movably receive the guide of the indicator and expose the window and the arrow through the opening.

* * * * *